United States Patent Office 2,783,268
Patented Feb. 26, 1957

2,783,268

PRODUCTION OF ADIPONITRILE

Harry B. Copelin and Frederick J. Feldhousen, Jr., Niagara Falls, N. Y., assignors to E. I. du Pont de Nemours & Company, Wilmington, Del., a corporation of Delaware No Drawing. Application July 25, 1955,
Serial No. 524,291

7 Claims. (Cl. 260—465.8)

This invention relates to the manufacture of adiponitrile by the cyanidation of 1,4-dichlorobutane.

Heretofore various proposals have been advanced for cyaniding 1,4-dichlorobutane to the corresponding adiponitrile by means of sodium cyanide. Generally these proposals require the use of a cyanidation solvent such as an alcohol, an ether, an amide or the like. More recently it has been discovered that preformed adiponitrile, alone or preferably containing a little water to increase the solubility of the inorganic cyanide utilized, can itself serve as the reaction medium.

A disadvantage common to all the processes mentioned is the appearance, during the course of the cyanidation reaction, of a solid phase in the reacting medium. This phase consists largely of common salt but also includes inorganic cyanides and expensive organic materials, especially product adiponitrile, carried down with the salt. Recovery of the nonsaline compounds is both complex and costly, greatly burdening the economics of the process to which it must be applied.

Besides requiring the addition of several steps to the over-all procedure, the solid phase interferes with the cyanidation itself. Its precipitation, for example, tends to fill the reaction apparatus and clog the pipes employed. Under some circumstances, moreover, the precipitate forms a pasty, semifluid mass very difficult to control.

A general object of this invention, is, consequently to effect improvements in the cyanidation of 1,4-dichlorobutane.

A specific object is to provide improvements in the cyanidation process eliminating the formation of a solid phase during the reaction.

The above-mentioned and yet other objects are achieved in accordance with this invention by a process in which adiponitrile mixed with water is used as the reaction solvent under such conditions that two liquid phases but no solid phases are produced. In this process the 1,4-dichlorobutane and sodium cyanide are contacted either batch-wise or continuously in the water-adiponitrile mixture.

Conditions which must be carefully or critically controlled to effect the desired result are (1) the concentration of water or brine, (2) the temperature and (3) the pressure. Also of importance are the concentrations of the solvent adiponitrile and dichlorobutane and of the aqueous sodium cyanide solution preferably used to supply the cyanide. When these conditions are regulated as noted below, the spent cyanidation mixture will separate cleanly and almost instantaneously into an aqueous phase containing all the salt produced and an organic phase containing adiponitrile and unreacted dichlorobutane.

For the best results, a reaction mixture comprising 45–65% by weight of water is preferred. At lower concentrations of water solids may appear. At higher concentrations, control of the pressure and separation of the products become difficult. When, however, the 45-65% range is employed the reaction proceeds smoothly without the formation of a solid phase and the products separate rapidly upon standing.

The water content of the reacting mixture is basically controlled by the solubility of sodium chloride, around 21% by weight. It is most conveniently maintained by the use of solutions of sodium cyanide as one reactant. The solutions should not have a solid content of greater than about 20% since more highly concentrated solutions do not supply enough water to keep all the sodium chloride dissolved. Solutions of lesser concentration can be used but tend to supply an unnecessary quantity of water. The total quantity of sodium cyanide required, and hence of 20% solution, is determined by the quantity of dichlorobutane.

A preferred reaction temperature is around 100° C., i. e. 95–105° C. In this narrow temperature range ambient pressure, around 760 mm. of Hg, can be employed. Yield of adiponitrile is also at a maximum at these temperatures. Temperatures of up to about 130° C. are usable but above about 120° C. are not desirable. All temperatures above about 105° C. require superatmospheric pressure to maintain the water in the mixture. Autogenous pressure is satisfactory to accomplish this result. Above 120° C. this pressure may become excessive. Hydrolysis of the product may also become excessive above about 120° C.

Some solvent adiponitrile is essential to dissolve the organic material, dichlorobutane, employed. The weight of adiponitrile should, in general, at least be equal to that of the dichlorobutane, although somewhat smaller amounts can be used. It may vary between about 2 and 20%.

The weight of sodium cyanide present should be stoichiometrically equivalent to that of the dichlorobutane, i. e., the ratio of cyanide to dichlorobutane should be at least about 100/126 and preferably 1/1. The weight of water is at least four times that of the cyanide and may be as high as about five times the latter. The water:cyanide:dichlorobutane weight ratio should be between around 4:1:1 and 5:1:1.

Hold-up time in the reactor is not sharply critical. Contact between stoichiometric quantities of reactants, i. e., sodium cyanide and 1,4-dichlorobutane, should, however, be at least one hour for best results. Up to two hours can be used to advantage. Longer periods are also usable but do not yield any commensurate gains.

Since all reactants and products of this invention are liquids, the process described lends itself readily to continuous operation. In such operation sodium cyanide solution is added continuously to the adiponitrile. Equivalent amounts of 1,4-dichlorobutane are added separately to the adiponitrile simultaneously with the cyanide. The resulting mixture is thoroughly agitated as by a conventional stirrer and a volume equivalent to the combined volumes of the dichlorobutane and the cyanide solution is continuously withdrawn.

The withdrawn portion of the spent mixture is allowed to stand for a short while. Aqueous and organic layers appear and are easily separated by decantation. The organic layer, which consists primarily of adiponitrile, some dissolved water, unreacted 1,4-dichlorobutane and by-products, is easily resolved into its components by fractional distillation. The aqueous layer is essentially brine which can be evaporated to yield salt. Further purification of the salt is undertaken as necessary. If it is so desired, incomplete evaporation of the brine can be utilized and the saturated aqueous portion recirculated through the system carrying with it unreacted cyanide and valuable organic impurities.

The low temperatures necessitated by operation with two liquid phases give sluggish reactions and low conversions. For these reasons use of a catalyst is preferred. Satisfactory catalysts are calcium chloride, disclosed in application Serial Number 426,934, filed April 30, 1954, now Patent No. 2,715,138, and the quaternary ammonium compounds of application Serial Number 478,542, filed December 29, 1954. The disclosures of these applications are specifically incorporated by reference herein.

Calcium chloride and quaternary ammonium monomers, e. g., quaternary ammonium halides, improve conversions and cyanidation. All, however, are water-soluble and are removed from the reacting system in the aqueous phase. Replacement and separation from sodium chloride complicate the process.

Preferred catalysts are, consequently, chunks or relatively large aggregates of polymeric quaternary ammonium anion-exchange resins. A description of these synthetic resins is given in "Ion Exchange Resins" by Kunin and Myers (Wiley and Sons, N. Y., 1950), pages 38–59. "Amberlite" IRA–400, sold by the Rohm and Haas Company, is a preferred representative of these catalysts. Chemically, it is the chloride of the copolymer of vinyl pyridine and divinyl benzene quaternized with dimethyl sulfate. Other suitable resins may, of course, be substituted for the "Amberlite" IRA–400. It will be understood that when an ion-exchange resin is used as the catalyst, agitation may be supplied by passage of the reactants through a bed of the catalyst rather than by an agitator.

There follow some examples which illustrate the invention in more detail. All percentages given are in terms of weight. No solid phase appeared in the product of any run recorded and the liquid phases separated cleanly and rapidly.

EXAMPLE 1

A series of batch runs was made under essentially autogenous pressure and at various temperatures to determine conversions. In each case the corresponding theoretical quantities of 1,4-dichlorobutane (DCB) and 20% sodium cyanide solution were admixed with adiponitrile (ADN) solvent in a sealed autoclave and agitated. The total concentration of water in the reaction mixtures was about 65%. After the chosen reaction period the mixture was allowed to settle and divide into two distinct layers. The layers were separated by decantation and the organic layer analyzed by distillation. Results are shown in Table I.

Table I
BATCH RUNS—TWO LIQUID PHASES

| Run | Temperature, °C. | Reaction time (minutes) | Wt. of ADN solvent (g.) | Wt. of DCB (g.) | Conversion of DCB to ADN (percent) |
|---|---|---|---|---|---|
| 1 | 100 | 150 | 180 | 127 | 23.7 |
| 2 | 100 | 150 | 680 | 88 | 44.0 |
| 3 | 130 | 30 | 680 | 88 | 57.8 |
| 4 | 126 | 30 | 680 | 88 | 41.3 |
| 5 | 117 | 30 | 680 | 88 | 24.0 |

EXAMPLE 2

Run 5 of Example 1 was twice substantially repeated except that in one instance 8 g. of tetramethyl ammonium hydroxide and in the other 20 g. of "Amberlite" IRA–400 was used as a catalyst. 27.5% conversion was obtained in 30 minutes with the tetramethyl ammonium hydroxide while a 34.4% conversion was obtained in 30 minutes with the IRA–400.

EXAMPLE 3

A series of continuous runs was made under autogenous pressure. 108% of the quantity of 20% cyanide solution necessary to cyanide the dichlorobutane was used in Runs 6–8 and the stoichiometric quantity in the other two runs.

The runs were initiated by feeding the dichlorobutane and aqueous sodium cyanide into a reactor containing pure adiponitrile. The concentration of water was then allowed to build up to and maintained at 45–65%. Catalysts were employed as noted.

The products separated rapidly upon standing and the organic layer was distilled. Results are shown in Table II.

Table II
CONTINUOUS RUNS—TWO LIQUID PHASES

| Run | Additive | Temp. (°C.) | Pressure (mm. Hg) | Hold-up time (minutes) | ADN, Yield | Conversion of DCB to ADN (percent) |
|---|---|---|---|---|---|---|
| 6 | 50 g. IRA–400 | 100 | 760 | 80 | 97.5 | 28.2 |
| 7 | CaCl₂(3%) | 120 | 1,024 | 80 | 87.5 | 39.4 |
| 8 | None | 100 | 760 | 80 | 83.4 | 4.3 |
| 9 | 200 g. IRA–400 | 100 | 760 | 400 | 87.1 | 54.1 |
| 10 | 674 g. IRA–400 | 100 | 760 | 200 | 94.3 | 72.8 |

Having described the invention, we claim:

1. The method of producing adiponitrile which comprises reacting a dissolved alkali metal cyanide and 1,4-dichlorobutane at 95–120° C. and autogenous pressure in a reaction mixture comprising the cyanide, 1,4-dichlorobutane, preformed adiponitrile and about 45–65% by weight of water, permitting the spent reaction mixture to stand and divide into a lower brine and an upper organic layer, separating the layers by decantation and recovering product adiponitrile from the organic layer.

2. The method of claim 1 in which the temperature is about 95°–105° C. and the pressure is ambient.

3. The method of claim 1 in which the liquid reaction mixture contains a quaternary ammonium compound.

4. The method of claim 3 in which the quaternary ammonium compound is solid, insoluble ion-exchange resin.

5. The method of claim 1 in which the liquid reaction mixture contains calcium chloride.

6. The method of claim 1 in which the product adiponitrile is recovered by distillation.

7. The process of manufacturing adiponitrile which comprises continuously feeding 1,4-dichlorobutane and an approximately 20% aqueous solution of sodium cyanide simultaneously with preformed adiponitrile to yield a reaction mixture comprising about 45–65% by weight of water, reacting the sodium cyanide and 1,4-dichlorobutane with agitation at a temperature of 95°–120° C. and autogenous pressure, continuously withdrawing a volume of reacted mixture equal to the volume of reactants added thereto, hold-up time being at least about ½ hour, allowing the withdrawn volume to stand and divide into organic layers, separating the layers by decantation and recovering adiponitrile by distillation from the separated organic layer.

References Cited in the file of this patent
UNITED STATES PATENTS
2,715,138    Crane _____ Aug. 9, 1955